United States Patent
Oyama

(10) Patent No.: US 12,114,257 B2
(45) Date of Patent: Oct. 8, 2024

(54) CONNECTION CONTROL DEVICE, COMMUNICATION SYSTEM, AND CONNECTION CONTROL METHOD

(71) Applicant: FUJITSU LIMITED, Kawasaki (JP)

(72) Inventor: Teppei Oyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 424 days.

(21) Appl. No.: 17/569,565

(22) Filed: Jan. 6, 2022

(65) Prior Publication Data

US 2022/0312310 A1 Sep. 29, 2022

(30) Foreign Application Priority Data

Mar. 25, 2021 (JP) ................. 2021-051931

(51) Int. Cl.
*H04W 48/20* (2009.01)
*H04W 28/086* (2023.01)

(52) U.S. Cl.
CPC ......... *H04W 48/20* (2013.01); *H04W 28/086* (2023.05)

(58) Field of Classification Search
CPC ... H04W 48/20; H04W 28/086; H04W 24/02; H04W 92/12; Y02D 30/70
See application file for complete search history.

(56) References Cited

U.S. PATENT DOCUMENTS

| 2012/0208581 | A1 | 8/2012 | Ishida et al. |
| 2015/0087324 | A1* | 3/2015 | Ishida ............ H04W 16/08 455/452.2 |
| 2022/0039022 | A1* | 2/2022 | Liu ............... H04W 52/36 |

FOREIGN PATENT DOCUMENTS

| JP | 2012-169741 A | 9/2012 |
| JP | 2013-77965 A | 4/2013 |
| JP | 2013-90039 A | 5/2013 |

* cited by examiner

*Primary Examiner* — Jae Y Lee
(74) *Attorney, Agent, or Firm* — Myers Wolin, LLC

(57) ABSTRACT

A connection control device includes: a memory; and a processor coupled to the memory. The processor executes a process including: acquiring information on reception power in a plurality of terminal devices received from each of a plurality of radio units; aggregating an estimated communication load in each of the radio units by using the information on the reception power; determining a radio unit that belongs to each of a plurality of cells on a basis of an index indicating variance in a processing load for each cell associated with the estimated communication load in each of the radio units in the respective cells; and generating connection control information that allows a baseband processing device that manages a cell to be connected to the radio unit that belongs to the cell.

9 Claims, 13 Drawing Sheets

CONNECTION CONTROL DEVICE, COMMUNICATION SYSTEM, AND CONNECTION CONTROL METHOD

CROSS-REFERENCE TO RELATED APPLICATION

This application is based upon and claims the benefit of priority of the prior Japanese Patent Application No. 2021-051931, filed on Mar. 25, 2021, the entire contents of which are incorporated herein by reference.

FIELD

The embodiments discussed herein are related to a connection control device, a communication system, and a connection control method.

BACKGROUND

In recent years, in a radio communication system, a distributed antenna system (DAS) in which a base station device is separated into, for example, baseband units (BBUs) and radio units (RUs) and a cell for each BBU is formed by disposing a plurality of RUs connected to the respective BBUs in a distributed manner is becoming widely used. The BBUs are baseband processing devices each performing a baseband process on a signal, whereas the RUs are radio units each including an antenna and performing a radio process on the signal.

In the DAS, it is possible to form cells by relatively freely disposing the plurality of RUs; therefore, a multipoint configuration using the DAS is also effective in radio communication that uses high frequency bands such as millimeter waves adopted in, for example, the fifth generation mobile communication system (5G), that are less likely to pass through shielding objects. If a terminal device is able to transmit and receive radio waves to and from one of the plurality of RUs that forms a cell, the terminal device is able to communicate with the BBU that forms this cell.

Patent Document 1: Japanese Laid-open Patent Publication No. 2012-169741
Patent Document 2: Japanese Laid-open Patent Publication No. 2013-090039
Patent Document 3: Japanese Laid-open Patent Publication No. 2013-077965

However, distribution of traffic volumes of the radio communication is changed depending on time of day; therefore, there is a problem in that a bias is generated in the traffic volume for each cell and each RU, and thus, a processing load of an associated BBU is sometimes increased.

For example, if a certain cell becomes crowded and a lot of terminal devices are concentrated, overload of the BBU associated with this cell occurs. In such a case, it is conceivable to reduce the processing load of the BBU associated with the subject cell by allowing some terminal devices that perform radio communication with a RU included in the subject cell to perform radio communication with a RU included in an adjacent cell. However, some terminal devices are allowed to be connected to the adjacent cell; therefore, communication quality of these terminal device is degraded and throughput of the entire system is decreased accordingly.

SUMMARY

According to an aspect of an embodiment, a connection control device includes: a memory; and a processor coupled to the memory. The processor executes a process including: acquiring information on reception power in a plurality of terminal devices received from each of a plurality of radio units; aggregating an estimated communication load in each of the radio units by using the information on the reception power; determining a radio unit that belongs to each of a plurality of cells on a basis of an index indicating variance in a processing load for each cell associated with the estimated communication load in each of the radio units in the respective cells; and generating connection control information that allows a baseband processing device that manages a cell to be connected to the radio unit that belongs to the cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
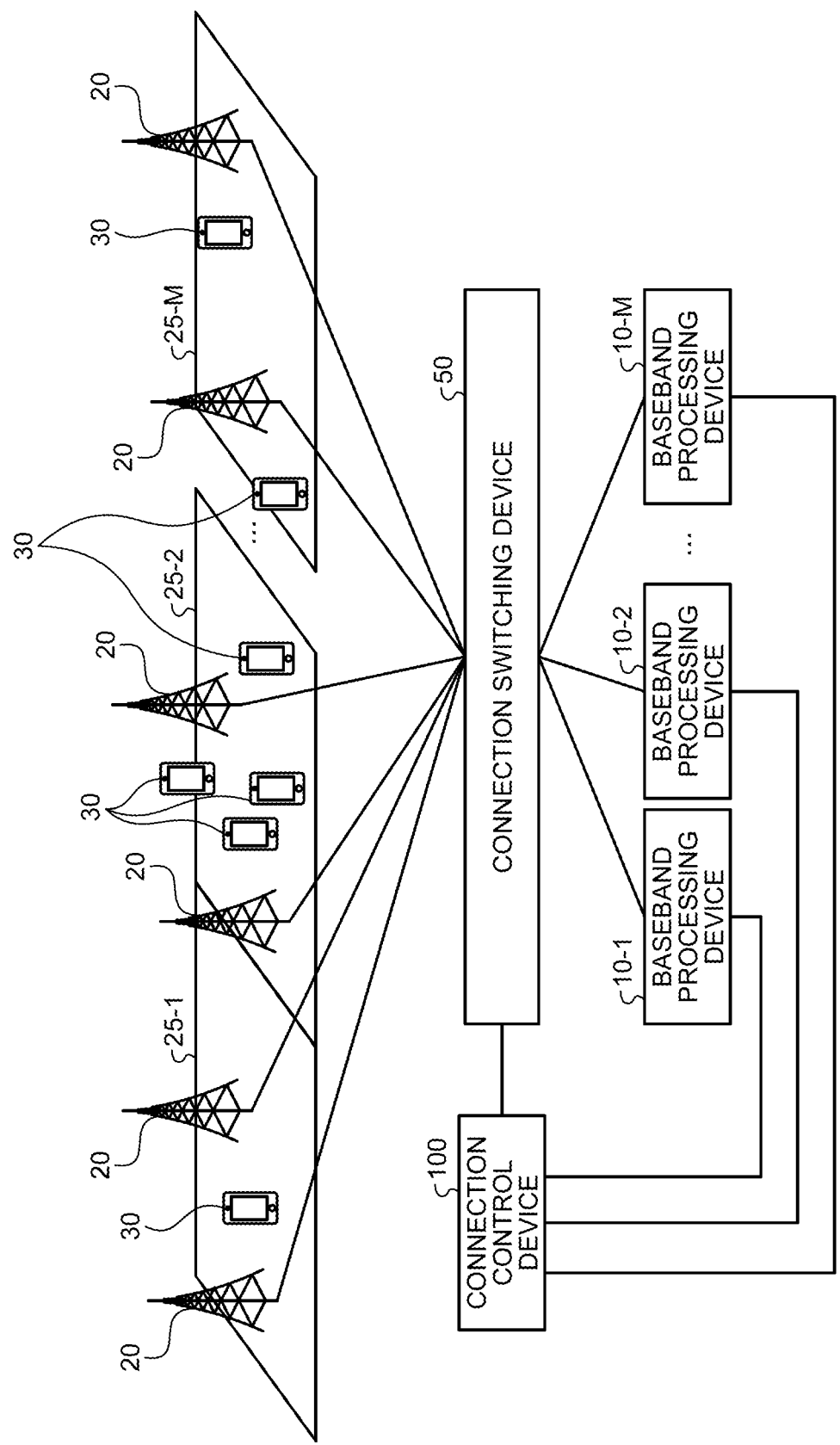
FIG. 1 is a diagram illustrating a configuration example of a radio communication system.

FIG. 1 is a diagram illustrating a configuration example of a radio communication system according to a first embodiment. The radio communication system is configured such that a plurality of baseband processing devices 10-1 to 10-M (M is an integer greater than or equal to two) and a plurality of radio units (RU) 20 are connected via a connection switching device 50. The baseband processing device 10-1 manages a cell 25-1 that is formed by the RUs 20 that are connected to the baseband processing device 10-1, the baseband processing device 10-2 manages a cell 25-2 formed by the RUs 20 connected to the baseband processing device 10-2, and, in a similar manner, the baseband processing device 10-M manages a cell 25-M formed by the RUs 20 connected to the baseband processing device 10-M.

A terminal device 30 that is present in a certain cell 25-X (X is 1 to M) performs radio communication with the RU 20 included in the cell 25-X, and transmits and receives data to and from the baseband processing device 10-X that manages the cell 25-X. The terminal device 30 measures reception power at a predetermined period by using a reference signal that is transmitted from the RU 20, and reports information on the measured reception power to the baseband processing device 10-X that manages the cell 25-X, in which the terminal device 30 is present. At this time, the terminal device 30 measures not only the reception power received from the RU 20 with which the own terminal device 30 performs radio communication, but also the reception power received from the other RUs 20 included in the cell 25-X and the RUs 20 included in the other cells 25-1 to 25-M, and transmits reception power information on each of the RUs 20 to the baseband processing device 10-X via the RU 20 with which the own terminal device 30 performs radio communication.

Connection relationships between the baseband processing devices 10-1 to 10-M and the RUs 20 are able to be switched by the connection switching device 50. Then, a connection control device 100 is connected to the connection switching device 50, and the connection control device 100 performs control of a connection between the baseband processing devices 10-1 to 10-M and the RUs on the basis of the reception power in the terminal devices 30.

Namely, the connection control device 100 collects the pieces of reception power information for each of the RUs 20 related to the terminal devices 30 from the baseband processing devices 10-1 to 10-M, and estimates the terminal device 30 (hereinafter, also referred to as a "connected terminal") that performs radio communication with each of the RUs 20 on the basis of the collected reception power information. Then, the connection control device 100 determines, on the basis of the connected terminals for each of the RUs 20, the RU 20 to be connected to each of the baseband processing devices 10-1 to 10-M such that variations in the processing load for each of the cells 25-1 to 25-M is reduced. The connection switching device 50 switches the connections between the baseband processing devices 10-1 to 10-M and the RUs 20 in accordance with the connection relationships between the baseband processing devices 10-1 to 10-M and the RUs 20 determined by the connection control device 100.

Figure 2:
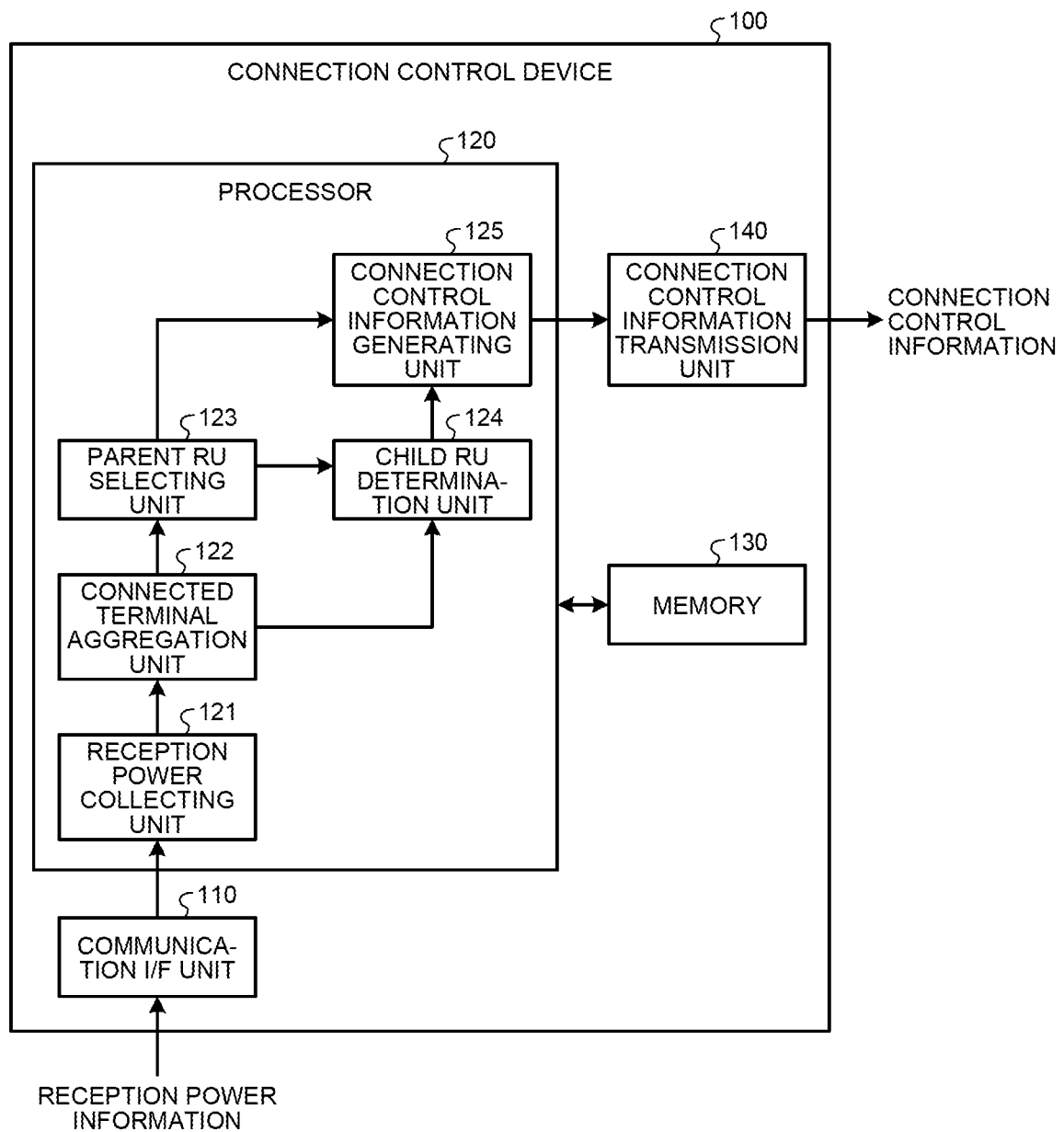
FIG. 2 is a block diagram illustrating a configuration of a connection control device according to a first embodiment.

FIG. 2 is a block diagram illustrating a configuration of the connection control device 100 according to the first embodiment. The connection control device 100 illustrated in FIG. 2 includes a communication interface unit (hereinafter, simply referred to as a "communication I/F unit") 110, a processor 120, a memory 130, and a connection control information transmission unit 140.

The communication I/F unit 110 is connected to the baseband processing devices 10-1 to 10-M in a wired manner and is an interface for performing communication with the baseband processing devices 10-1 to 10-M. The communication I/F unit 110 receives, from the baseband processing devices 10-1 to 10-M, the reception power information for each of the RUs 20 reported from each of the terminal devices 30.

The processor 120 includes, for example, a central processing unit (CPU), a field programmable gate array (FPGA), a digital signal processor (DSP), or the like, and performs overall control of the connection control device 100. Specifically, the processor 120 includes a reception power collecting unit 121, a connected terminal aggregation unit 122, a parent RU selecting unit 123, a child RU determination unit 124, and a connection control information generating unit 125.

The reception power collecting unit 121 collects, from the reception power information received by the communication I/F unit 110, the reception power in each of the terminal device 30 received from each of the RUs 20. The reception power collecting unit 121 collects, regarding each of the terminal devices 30, not only the reception power received from the RU 20 with which the subject terminal devices 30 perform radio communication, but also the reception power received from the other RUs 20 included in the cell in which the subject terminal devices 30 are present and the reception power received from the other RUs 20 included in the other cells. Namely, the reception power collecting unit 121 collects, regarding each of the terminal devices 30, the reception power received from all of the RUs 20 from which the terminal devices 30 are able to receive the reference signal.

The connected terminal aggregation unit 122 aggregates the pieces of reception power in each of the terminal devices 30 received from the RUs 20 and estimates a connected terminal for each of the RUs 20. Specifically, the connected terminal aggregation unit 122 specifies, for each of the terminal devices 30, the RU 20 contributing the maximum reception power, and estimates that each of the terminal devices 30 is the connected terminal that is to be connected to the specified RU 20. Then, the connected terminal aggregation unit 122 aggregates the number of connected terminals to be connected to the respective RUs 20. The number of connected terminals corresponds to a communication load of the RU 20; therefore, it can be said that the connected terminal aggregation unit 122 aggregates an estimated communication load in each of the RUs 20 in a case where the connected terminals are connected.

The parent RU selecting unit 123 selects, from the aggregation result obtained by the connected terminal aggregation unit 122 and location information on each of the RUs 20, a parent RU of each of the cells 25-1 to 25-M. Specifically, first, the parent RU selecting unit 123 selects the RU 20 having the maximum number of connected terminals as a parent RU of a single cell (for example, the cell 25-1). Then, the parent RU selecting unit 123 selects the RU 20 in which a distance from the selected parent RU is the maximum as a parent RU of a subsequent single cell (for example, the cell 25-2). Furthermore, the parent RU selecting unit 123 selects the RU 20 in which the sum of the distances from the selected parent RUs is the maximum as a parent RU of a single cell (for example, the cell 25-3). In this way, the parent RU selecting unit 123 selects the RU 20 having the maximum number of connected terminals as a first parent RU, and sequentially selects the RU 20 in which the sum of the distances from the selected parent RUs is the maximum as the parent RU, so that the parent RU selecting unit 123 selects M parent RUs associated with the cells 25-1 to 25-M.

The child RU determination unit 124 calculates an index of variations in the number of connected terminals in a cell, and determines child RUs belonging to the same cells as the cells to which the respective M parent RUs belong such that the index becomes small. Specifically, the child RU determination unit 124 selects the cell (for example, the cell 25-Y) having the minimum number of connected terminals, and specifies an adjacent RU that is adjacent to the RU 20 that has already belonged to the subject cell 25-Y. Then, the child RU determination unit 124 calculates an index of variance in number of connected terminals included in the cell in a case where the adjacent RU is added to the cell 25-Y, and determines that the adjacent RU that minimizes allows the index to be the smallest as the child RU that belongs to the cell 25-Y. Furthermore, the "number of connected terminals in a cell" mentioned here is the sum of the number of connected terminals that are connected to all of the RUs 20 belonging to the cell. The child RU determination unit 124 determines, regarding the cell having the minimum number of connected terminals, a single adjacent RU that minimizes a variance index of the number of connected terminals in the cell as a child RU, and repeatedly determines a child RU until all of the RUs 20 belong to any of the cells.

The connection control information generating unit 125 generates connection control information that allows the RU 20 for each of the cells 25-1 to 25-M to be connected to the baseband processing devices 10-1 to 10-M on the basis of the parent RU selected by the parent RU selecting unit 123 and the child RU determined by the child RU determination unit 124. Namely, the connection control information generating unit 125 generates the connection control information that allows the parent RU and the child RU belonging to the cell 25-1 to be connected to the baseband processing device 10-1, that allows the parent RU and the child RU belonging to the cell 25-2 to be connected to the baseband processing device 10-2, and that allows, in a similar manner, the parent RU and the child RU belonging to the cell 25-M to be connected to the baseband processing device 10-M.

The memory 130 includes, for example, a random access memory (RAM), a read only memory (ROM), or the like and stores information that is used for a process performed by the processor 120.

The connection control information transmission unit 140 transmits the connection control information generated by the connection control information generating unit 125 to the connection switching device 50. Consequently, the connection switching device 50 switches, in accordance with the connection control information, the connection with the baseband processing devices 10-1 to 10-M and the RU 20 such that the RUs 20 belonging to the cells 25-1 to 25-M are connected to the respective baseband processing devices 10-1 to 10-M.

Figure 3:
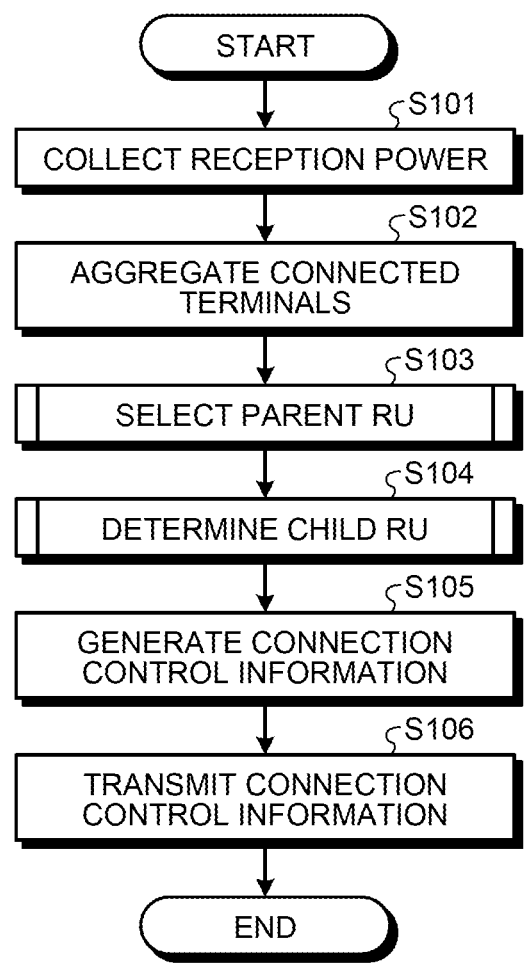
FIG. 3 is a flowchart illustrating a connection control method according to the first embodiment.

In the following, a connection control method used in the connection control device 100 having configuration described above will be described with reference to the flowchart illustrated in FIG. 3.

The terminal device 30 in the radio communication system measures the reception power of the reference signal received from each of the RUs 20 at a predetermined period, and reports the reception power information indicating the reception power for each of the RUs 20 to the baseband processing devices 10-1 to 10-M that are associated with the own cell. The reception power information reported from each of the terminal devices 30 is transmitted from the baseband processing devices 10-1 to 10-M to the connection control device 100, and is received by the communication I/F unit 110 in the connection control device 100. Then, the reception power in each of the terminal devices 30 received from each of the RUs 20 is collected by the reception power collecting unit 121 (Step S101).

The reception power in each of the terminal devices 30 is used to aggregate the connected terminals performed by the connected terminal aggregation unit 122. Namely, the RU 20 contributing the maximum reception power is specified for each of the terminal devices 30 by the connected terminal aggregation unit 122, and it is estimated that the terminal devices 30 are the connected terminals that are to be connected to the respective specified RU 20. Then, the number of connected terminals to be connected to the associated RUs 20 is aggregated by the connected terminal aggregation unit 122 (Step S102).

If the number of connected terminals to be connected to the associated RUs 20 is aggregated, the same number of parent RUs as the number of the cells 25-1 to 25-M are selected by the parent RU selecting unit 123 (Step S103). Namely, M parent RUs are selected by the parent RU selecting unit 123 on the basis of the number of connected terminals and the location information for each of the RUs 20. Selection of the parent RUs is performed by selecting the RU 20 having the maximum number of connected terminals as a first parent RU, and subsequently selecting the RU 20 in which the sum of the distances from the selected parent RUs is the maximum as a subsequent parent RU. A parent RU selection process will be described in detail later.

If the M parent RUs are selected, the child RU belonging to the same cell as the cell in which these parent RUs belong is determined by the child RU determination unit 124 (Step S104). Namely, a variance index of the number of connected terminals in the cell in a case where the adjacent RU is added to the cell is calculated by the child RU determination unit 124, and an adjacent RU that minimizes the variance index is determined as the child RU. The determination of the child RU is repeated until all of the RUs 20 belong to any of the cells. A child RU determination process will be described in detail later.

All of the RUs 20 belong any of the cells 25-1 to 25-M by the parent RU selection process and the child RU determination process, so that connection control information that allows the baseband processing devices 10-1 to 10-M to be connected to the RUs 20 that belong to the cells 25-1 to 25-M is generated by the connection control information generating unit 125 (Step S105). The generated connection control information is transmitted from the connection control information transmission unit 140 to the connection switching device 50 (Step S106), and then, the connection switching device 50 switches the connections between the baseband processing devices 10-1 to 10-M and the RUs 20 in accordance with the connection control information.

In this way, the terminal devices 30 are defined as the connected terminals that are to be connected to the RU 20 each contributing the maximum reception power for the respective connected terminals, the RU 20 belonging to each of the cells is determined such that the variance index of the number of connected terminals in the cell is minimized, and the connection relationships between the baseband processing devices 10-1 to 10-M and the RUs 20 associated with the cells are controlled. Consequently, the communication quality of the terminal devices 30 is not degraded, the variations in the number of connected terminals for each cell is reduced, and the processing load of the baseband processing devices 10-1 to 10-M is averaged. In other words, it is possible to suppress an increase in the processing load of the baseband processing devices 10-1 to 10-M while preventing degradation of the communication quality in the terminal device 30.

Figure 4:
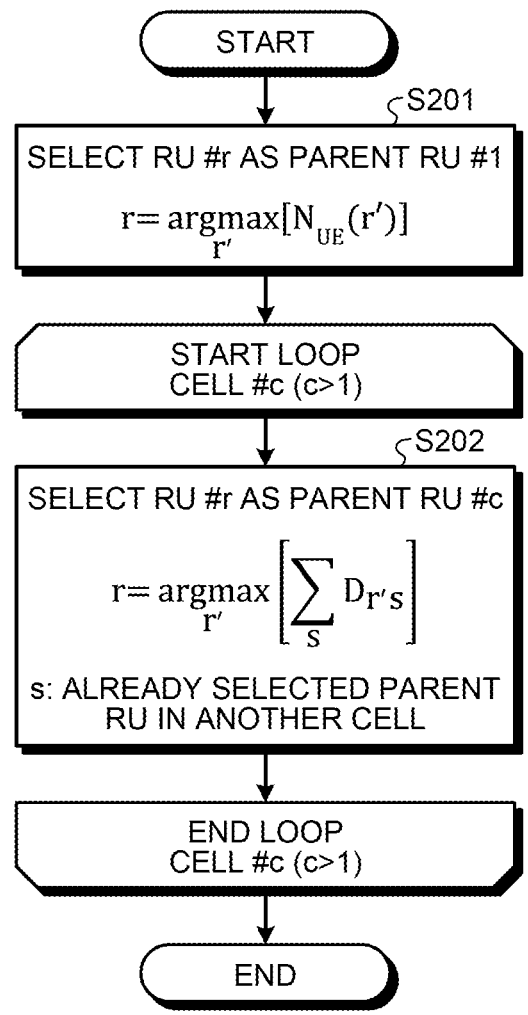
FIG. 4 is a flowchart illustrating a parent RU selection process.

In the following, the parent RU selection process will be specifically described with reference to the flowchart illustrated in FIG. 4. The following process is performed by the parent RU selecting unit 123.

First, the parent RU in a first cell is selected from the number of connected terminals for each of the RUs 20. Namely, a RU #r (r denotes identification information on the RU 20) that satisfies Equation (1) below is selected as a first parent RU #1 (Step S201).

$$r = \underset{r'}{\mathrm{argmax}}\, [N_{UE}(r')] \quad (1)$$

where, in Equation (1), $N_{UE}(r')$ denotes the number of connected terminals to be connected to a RU #r', argmax [P(x)] denotes a function that returns a variable x that maximizes P(x). Accordingly, the right side of Equation (1) returns r' indicating that the number of connected terminals $N_{UE}(r')$ is the maximum. When the RU #r determined by Equation (1) is selected as the first parent RU #1, the subsequent processes are repeated in accordance with the number of cells. Here, because the parent RU #1 in the first cell has been selected, the following process is repeated for the remaining (M−1) cells.

Namely, regarding a $c^{th}$ cell #c (1<c≤M), the RU #r that satisfies Equation (2) below is selected as the parent RU #c (Step S202).

$$r = \underset{r'}{\mathrm{argmax}}\, \left[\sum_{S} D_{r's}\right] \quad (2)$$

where, in Equation (2), s denotes identification information on an already selected parent RU in another cell, and $D_{r's}$ denotes a distance between the RU #r' and the RU #s. The distance between the RU #r' and the RU #s is able to be calculated from the location information on each of the RUs 20. The right side of Equation (2) returns r' indicating that the sum of the distances $D_{r's}$ from the already selected parent RUs is the maximum. A process for selecting the RU #r as the parent RU #c in the cell #c determined by using Equation (2) is repeated, and the parent RU is selected for each of the M cells 25-1 to 25-M. These parent RUs are disposed at positions at each of which the sum of the distances is the maximum.

Figure 5:
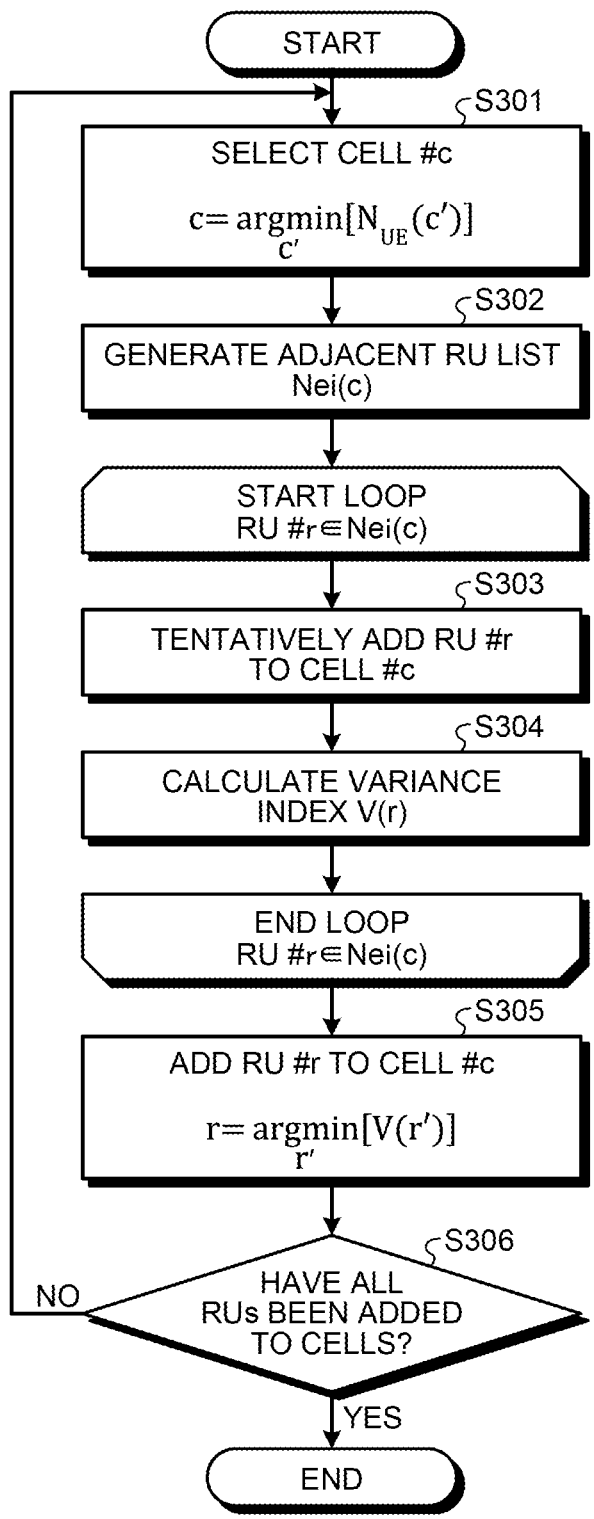
FIG. 5 is a flowchart illustrating a child RU determination process.

In the following, the child RU determination process will be specifically described with reference to the flowchart illustrated in FIG. 5. The following process is performed by the child RU determination unit 124.

Here, because the parent RUs associated with the respective M cells have already been selected, the cell #c (c denotes the identification information on the cell) is selected from these cells by using Equation (3) below (Step S301).

$$c = \underset{c'}{\mathrm{argmin}}\, [N_{UE}(c')] \quad (3)$$

where, in Equation (3), $N_{UE}(c')$ denotes the number of connected terminals in the cell #c', argmin[P(x)] denotes a function that returns a variable x that minimizes P(x). The number of connected terminals in the cell #c' is a total sum of the number of connected terminals to be connected to all of the RU 20 belonging to the cell #c'. The right side of Equation (3) above returns c' indicating that the number of connected terminals $N_{UE}(c')$ is the minimum. If the cell #c having the minimum number of connected terminals is selected by using Equation (3), a list Nei(c) of the adjacent RUs for the cell #c is generated (Step S302). Specifically, the RU 20 adjacent to any of the RUs 20 in the cell #c out of the RUs 20 that do not belong to any of the cells is added to the list Nei(c). At this time, whether or not the RU 20 is adjacent is able to be determined from the location information on the RUs 20.

If the list Nei(c) of the adjacent RUs for the cell #c is generated, the following process is repeated for each of the adjacent RUs for the cell #c included in the list Nei(c).

Namely, the single adjacent RU #r included in the list Nei(c) is tentatively added to the cell #c (Step S303), a variance index V(r) of the number of connected terminals in each of the cells in a case where the adjacent RU #r is added to the cell #c is calculated by using Equation (4) below (Step S304).

$$V(r) = \frac{1}{N_{cell}}\sum_{C} N_{UE}(c, r)^2 - \left(\frac{1}{N_{cell}}\sum_{C} N_{UE}(c, r)\right)^2 \quad (4)$$

where, in Equation (4), $N_{cell}$ denotes the number of cells (here, M), and $N_{UE}(c,r)$ denotes the number of connected terminals in the cell #c in a case where the adjacent RU #r is added to the cell #c. The variance index V(r) calculated by using Equation (4) serves as an index of the variations in the number of connected terminals included in each of the cells in a case where the single adjacent RU #r is added to the cell #c. The number of connected terminals in the cell serves as an index of the processing load of the baseband processing device associated with the subject cell; therefore, the variance index V(r) also serves as the index of the variations in the processing load of the baseband processing devices 10-1 to 10-M.

In this way, if the variance index V(r) used in a case where the adjacent RU #r is added to the cell #c is calculated for each of the adjacent RUs included in the list Nei(c), the adjacent RU #r that satisfies Equation (5) below is added as the child RU in the cell #c (Step S305).

$$r = \underset{r'}{\mathrm{argmin}}\, [V(r')] \quad (5)$$

Namely, the adjacent RU #r in which the variance index V(r) is minimized in a case where the adjacent RU #r is added to the cell #c is added to the cell #c as the child RU. This indicates that the adjacent RU is added to the cell such that the number of connected terminals for each cell is averaged as much as possible. Then, it is judged whether all of the RUs 20 are added to any of the cells as a child RU (Step S306), and, if the RU 20 that does not yet belong to any of the cells is present (No at Step S306), a process at Step S301 is repeated to select the cell #c having the minimum number of connected terminals.

By performing the child RU determination process described above, all of the RUs 20 belong to any of the cells, and the variations in the number of connected terminals for each cell is minimized. Namely, the number of connected terminals in each of the cells is averaged, and the baseband processing devices 10-1 to 10-M with an excessive processing load is not present. In other words, it is possible to suppress an increase in the processing load of the baseband processing devices 10-1 to 10-M.

As described above, according to the embodiment, each of the terminal devices is defined as the connected terminals that are to be connected to the RUs each contributing the maximum reception power for the respective connected terminals, and the RU belonging to each of the cells is determined such that the variations in the number of connected terminals for each cell is minimized. Consequently, it is possible to suppress an increase in the processing load of the baseband processing device by averaging the number of connected terminals included in the cells associated with the plurality of respective baseband processing devices without degrading the communication quality of the terminal devices.

[b] Second Embodiment

The characteristic of a second embodiment is to judge an adjacent relationships among the RUs by using interference scores among the RUs instead of judging the adjacent relationships among the RUs by using the location information on the RUs.

A configuration of a radio communication system according to the second embodiment is the same as that of the first embodiment (FIG. 1); therefore, descriptions thereof will be omitted.

Figure 6:
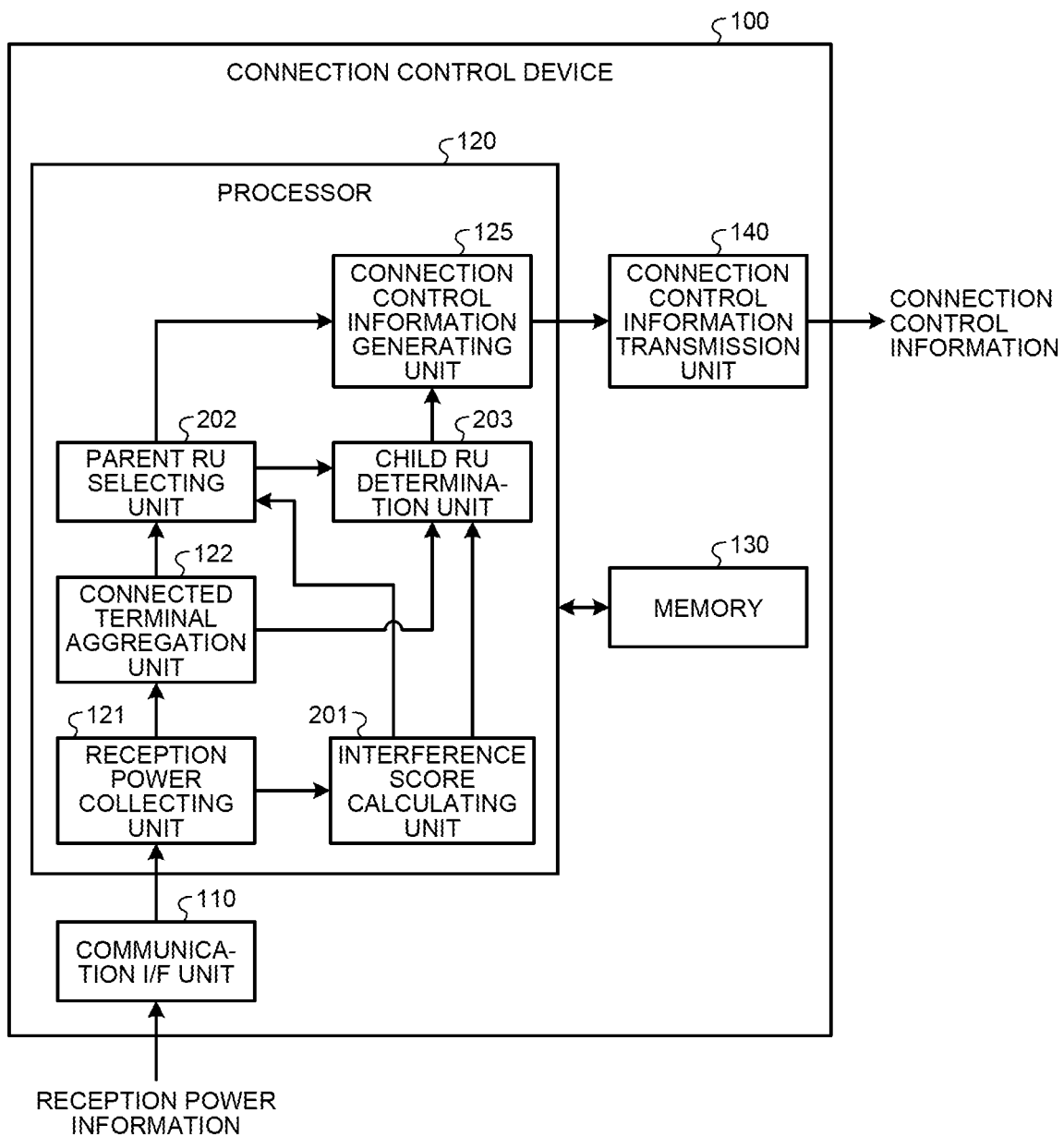
FIG. 6 is a block diagram illustrating a configuration of a connection control device according to a second embodiment.

FIG. 6 is a block diagram illustrating a configuration of the connection control device 100 according to the second embodiment. In FIG. 6, components that are the same as those illustrated in FIG. 2 are assigned the same reference numerals and descriptions thereof will be omitted. The connection control device 100 illustrated in FIG. 6 has a configuration in which an interference score calculating unit 201 is added to the connection control device 100 illustrated in FIG. 2, and a parent RU selecting unit 202 and a child RU determination unit 203 are added instead of the parent RU selecting unit 123 and the child RU determination unit 124, respectively.

The interference score calculating unit 201 calculates an interference score for each pair of the RUs 20 on the basis of the reception power in the terminal device 30. Specifically, the interference score calculating unit 201 calculates the number of terminal devices 30 in which a difference between the pieces of reception power received from the two RUs 20 constituting a pair is less than a predetermined threshold as an interference score of the pair of these two RUs 20. The interference score calculating unit 201 calculates an interference score of all of the combinations of the pair of the RUs 20. It is conceivable that the terminal device 30 in which a difference between the pieces of reception power received from the two RUs 20 is small is located at substantially the same distance from these two RUs 20. Consequently, if the number of terminal devices 30 in each of which the difference between the pieces of reception power is less than the predetermined threshold is large, these two RUs 20 are highly likely to be closely located. Accordingly, it is conceivable that the pair of the RUs 20 having a high interference score is a pair of the RUs 20 that are adjacent with each other.

The parent RU selecting unit 202 selects a parent RU of each of the cells 25-1 to 25-M from the aggregation result obtained by the connected terminal aggregation unit 122 and the interference score of each of the pairs of the RUs 20. Specifically, first, the parent RU selecting unit 202 selects the RU 20 having the maximum number of connected terminals as a parent RU included in a single cell (for example, the cell 25-1). Then, the parent RU selecting unit 202 selects the RU 20 having the smallest interference score with the selected parent RU as a parent RU included in a subsequent single cell (for example, the cell 25-2). Furthermore, the parent RU selecting unit 202 selects the RU 20 in which the sum of the interference score with each of the selected parent RUs is the smallest as a parent RU in a subsequent single cell (for example, the cell 25-3). In this way, the parent RU selecting unit 202 selects M parent RUs associated with the cells 25-1 to 25-M by selecting the RU 20 having the maximum number of connected terminals as a first parent RU, and sequentially selecting the RUs 20 in each of which the sum of the interference score of the pair of the selected parent RU is the minimum as the parent RUs.

The child RU determination unit 203 calculates an index of variations in the number of connected terminals in the cell, and determines a child RU belonging to the same cell as the cell to which each of the M parent RUs belongs such that the index is reduced. Specifically, the child RU determination unit 203 selects a cell (for example, the cell 25-Y) having the minimum number of connected terminals, and specifies an adjacent RU that is adjacent to the RU 20 that has already belongs to the subject cell 25-Y. At this time, the child RU determination unit 203 specifies the adjacent RU by using the interference score of each of the pairs of the RUs 20. Here, regarding the pair of the RU #r that has already belonged to the cell 25-Y and the RU #s that has not yet belonged to any of the cells, if an interference score $I_{rs}$ of this pair satisfies a condition (A), the RU #r and the RU #s are adjacent with each other.

$$I_{rs} > \alpha \times \max[I_{r1}, I_{r2}, \ldots, I_{s1}, I_{s2}, \ldots, I_{rs}] \quad (A)$$

where, $\alpha$ denotes a predetermined coefficient that is less than one, and max[a, b, c] denotes a function that returns the maximum value of a, b, and c. Therefore, if the interference score $I_{rs}$ of the pair of the RU #r and the RU #s is $\alpha$ times larger than the maximum value of all of the interference scores related to the RU #r and the RU #s, the RU #r and the RU #s are determined to be the adjacent RUs.

Then, the child RU determination unit 203 calculates an index of the variations in the number of connected terminals in a cell in a case where the adjacent RU is added to the cell 25-Y, and determines the adjacent RU that minimizes the index as the child RU for the cell 25-Y. The child RU determination unit 203 determines, regarding the cell having the smallest number of connected terminals, a single adjacent RU that minimizes the variance index of the number of connected terminals in the cell as a child RU, and repeatedly determines a child RU until all of the RUs 20 belong to any of the cells.

Figure 7:
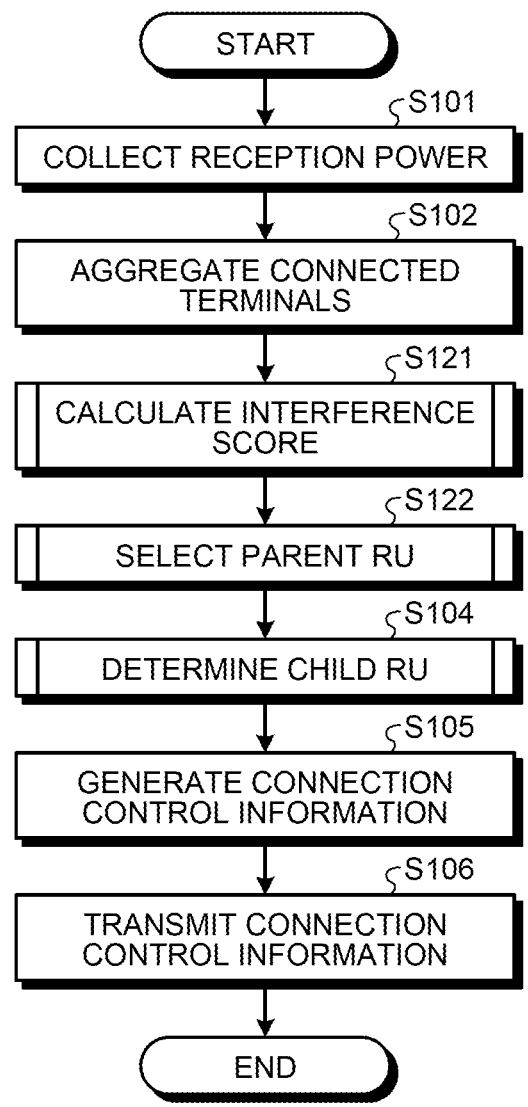
FIG. 7 is a flowchart illustrating a connection control method according to the second embodiment.

In the following, a connection control method used in the connection control device 100 having the configuration described above will be described with reference to the flowchart illustrated in FIG. 7. In FIG. 7, components that are the same as those illustrated in FIG. 3 are assigned the same reference numerals and descriptions thereof in detail will be omitted.

The reception power information reported from each of the terminal devices 30 included in the radio communication system is transmitted from the baseband processing devices 10-1 to 10-M to the connection control device 100, and is received by the communication I/F unit 110 in the connection control device 100. Then, the reception power in each of the terminal devices 30 received from the respective RUs 20 is collected by the reception power collecting unit 121 (Step S101), and the number of connected terminals connected to each of the RUs 20 is aggregated from the reception power in each of the terminal devices 30 by the connected terminal aggregation unit 122 (Step S102).

Furthermore, the interference score related to all of the pairs of the RUs 20 is calculated on the basis of the reception power in each of the terminal devices 30 by the interference score calculating unit 201 (Step S121). Namely, the number of the terminal devices 30 in which a difference between the pieces of reception power received from the respective pairs of the RUs 20 is less than the predetermined threshold is counted, and the number of the counted terminal devices 30 corresponds to the interference score of each of the pairs. The interference score calculation process will be described later in detail later.

The number of connected terminals to be connected to each of the RU 20 is aggregated, and, if the interference score of each of the pairs of the RUs 20 is calculated, the same number of parent RUs as the number of the cells 25-1 to 25-M are selected by the parent RU selecting unit 202 (Step S122). Namely, M parent RUs are selected by the parent RU selecting unit 202 on the basis of the number of connected terminals and the interference score related to each of the RUs 20. Selection of the parent RU is performed by selecting the RU 20 having the maximum number of connected terminals as a first parent RU, and selecting the RU 20 in which the sum of interference score with the selected parent RU is the minimum as a subsequent parent RU. The parent RU selection process will be described in detail later.

If the M parent RUs are selected, the child RU belonging to the same cell as the cell to which each of the M parent RUs belongs is selected by the child RU determination unit 203 (Step S104). Namely, the variance index of the number of connected terminals in a cell in a case where the adjacent RU is added to the cell is calculated by the child RU determination unit 203, and an adjacent RU that minimizes the variance index is determined as a child RU. Determination of the child RU is repeated until all of the RUs 20 belong to any of the cells.

All of the RUs 20 belong to any of the cells 25-1 to 25-M by the parent RU selection process and the child RU determination process, so that the connection control information that allows the baseband processing devices 10-1 to 10-M to be connected to the RUs 20 that belong to the respective cells 25-1 to 25-M is generated by the connection control information generating unit 125 (Step S105). The generated connection control information is transmitted from the connection control information transmission unit 140 to the connection switching device 50 (Step S106), and the connection switching device 50 switches the connections between the baseband processing devices 10-1 to 10-M and the RU 20 in accordance with the connection control information.

In this way, each of the terminal devices 30 is defined as the connected terminals that are to be connected to the RUs 20 each contributing the maximum reception power for the respective connected terminals, the RU 20 belonging to each of the cells is determined such that the variance index of the number of connected terminals for each cell is minimized, and then, the connection relationships between the baseband processing devices 10-1 to 10-M and the RUs 20 associated with the cells are controlled. Consequently, the communication quality of the terminal device 30 is not degraded, the variations in the number of connected terminals for each cell becomes small, and the processing loads of the baseband processing devices 10-1 to 10-M are averaged. In other words, it is possible to suppress an increase in the processing loads of the baseband processing devices 10-1 to 10-M while preventing degradation of the communication quality in the terminal device 30.

Figure 8:
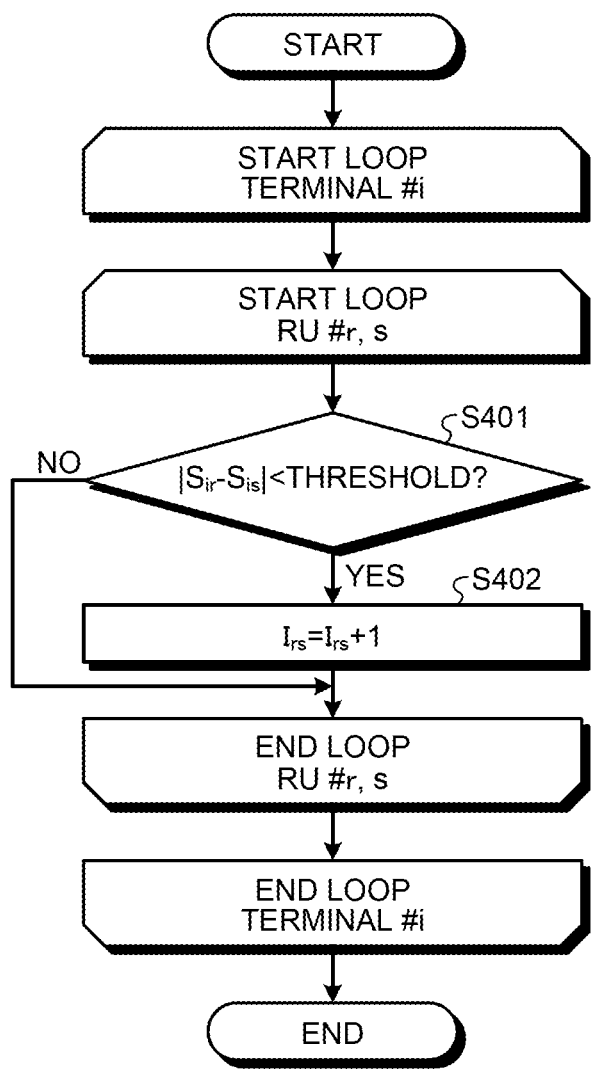
FIG. 8 is a flowchart illustrating an interference score calculation process.

In the following, the interference score calculation process will be specifically described with reference to the flowchart illustrated in FIG. 8. The following process is performed by the interference score calculating unit 201.

The interference score is calculated by counting the number of terminal devices 30 that satisfies the condition for the pair of the RUs 20, so that a process for judging whether to count a terminal #i regarding to the pair of the RU #r and the RU #s (r and s denote identification information on the RU 20) is repeated. Specifically, it is judged whether a difference between pieces of reception power $S_{i,r}$ in the terminal #i received from the RU #r and reception power $S_{i,s}$ in the terminal received from the RU #s is less than a predetermined threshold (Step S401). Then, if the difference between the pieces of reception power is less than the predetermined threshold (Yes at Step S401), the terminal #i is counted (Step S402), and, if the difference between the pieces of reception power is larger than or equal to the predetermined threshold (No at Step S401), the terminal #i is not counted, whereby the interference score $I_{rs}$ of the RU #r and the RU #s is updated.

An update of the interference score $I_{rs}$ obtained in this way is repeated for all of the pairs of the RU #r and the RU #s, and Furthermore, the update is repeated for all of the terminal #i, whereby the interference scores related to all of the pairs of the RUs 20 are calculated. The interference score for each of the pairs of the RUs 20 is stored in order to perform the parent RU selection process and the child RU determination process.

Figure 9:
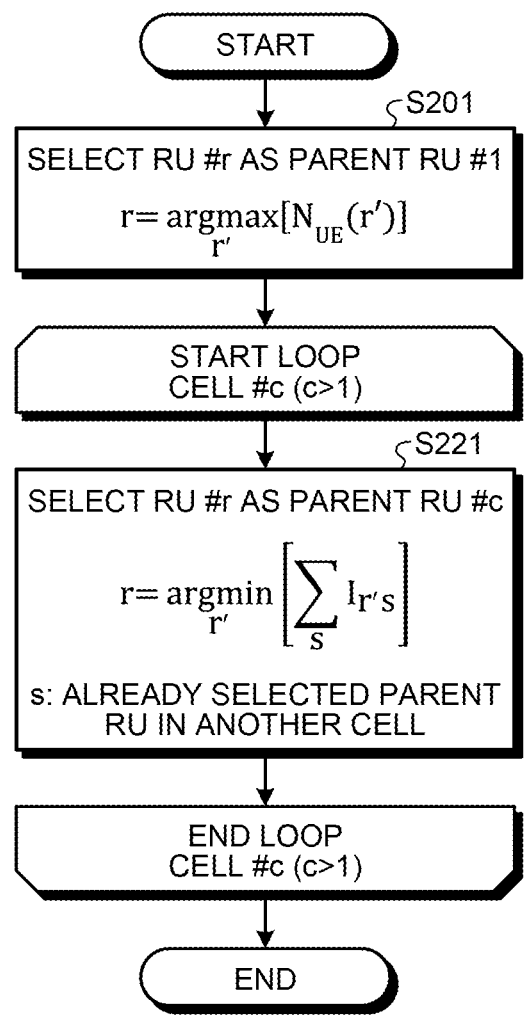
FIG. 9 is a flowchart illustrating a parent RU selection process.

In the following, the parent RU selection process will be specifically described with reference to the flowchart illustrated in FIG. 9. In FIG. 9, components that are the same as those illustrated in FIG. 4 are assigned the same reference numerals and descriptions thereof in detail will be omitted. The following process is performed by the parent RU selecting unit 202.

First, the parent RU in the first cell is selected from the number of connected terminals for each of the RUs 20. Namely, the RU #r (r denotes the identification information on the RU 20) that satisfies Equation (1) above is selected as the first parent RU #1 (Step S201). If the first parent RU #1 is selected, the following process is repeated in accordance with the number of cells. Here, because the first parent RU #1 in the cell has been selected, the following process is repeated for the remaining (M−1) cells.

Namely, regarding the $c^{th}$ cell #c (1<c≤M), the RU #r that satisfies Equation (6) below is selected as the parent RU #c (Step S221).

$$r = \underset{r'}{\mathrm{argmin}} \left[ \sum_{s} I_{r's} \right] \quad (6)$$

where, in Equation (6), s denotes identification information on an already selected parent RU in another cell, and $I_{r's}$ denotes an interference score of the pair of the RU #r' and the RU #s. Accordingly, the right side of Equation (6) returns r' indicating that the sum of the interference score $I_{r's}$ of the already selected parent RUs is the minimum. A process for selecting the RU #r as the parent RU #c in the cell #c is repeated, and the parent RU determined by using Equation (6) is selected for each of the M cells 25-1 to 25-M. These parent RUs are disposed at positions at each of which the sum of the interference scores is the minimum. Namely, the RUs 20 that are separated with each other and that are less likely to be interfered are selected as the parent RUs.

After the parent RUs are selected, similarly to the first embodiment, the child RU belonging to each of the cells is determined. Namely, a list of the adjacent RUs adjacent to the respective cells is generated, and, an adjacent RU that minimizes the variance index V(r) of the number of connected terminals in a case where the adjacent RU is added to the cell is determined as the child RU belonging to the cell. In the embodiment, the list of the adjacent RUs may be generated on the basis of a process for judging that the RU #r and the RU #s that satisfy the above described condition (A) using the interference score are adjacent with each other.

As described above, according to the embodiment, each of the terminal devices is defined as the connected terminals that are to be connected to the RUs each contributing the maximum reception power for the respective connected terminals, and the RU belonging to each of the cells is determined such that the variations in the number of connected terminals for each cell is minimized. Consequently, it is possible to suppress an increase in the processing loads of the baseband processing devices by averaging the number of connected terminals included in the cell associated with the plurality of respective baseband processing devices without degrading the communication quality of the terminal device. Furthermore, the adjacent relationship between the RUs is judged by using the interference score based on the reception power in the terminal device; therefore, it is possible to determine the RU belonging to each of the cells even when a RU in which location information is unknown is present.

[c] Third Embodiment

The characteristic of a third embodiment is to determine a RU belonging to each of the cells by using a traffic volume of the connected terminal for each RU instead of determining the RU belonging to each of the cells by using the number of connected terminals for each RU.

A configuration of a radio communication system according to the third embodiment is the same as that of the first embodiment (FIG. 1); therefore, descriptions thereof will be omitted.

Figure 10:
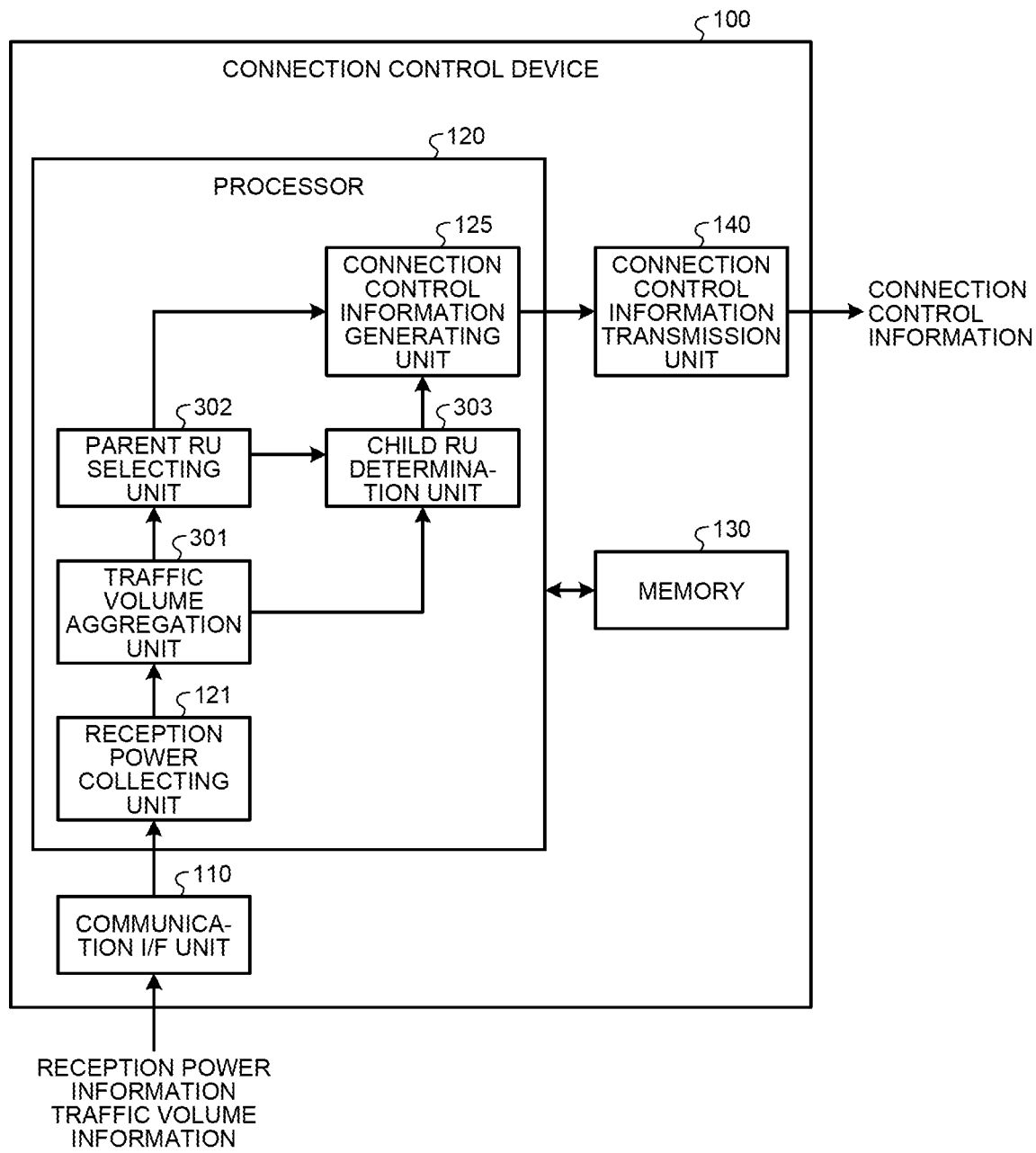
FIG. 10 is a block diagram illustrating a configuration of a connection control device according to a third embodiment.

FIG. 10 is a block diagram illustrating the configuration of the connection control device 100 according to the third embodiment. In FIG. 10, components that are the same as those illustrated in FIG. 2 are assigned the same reference numerals and descriptions thereof will be omitted. The connection control device 100 according to FIG. 10 has the configuration in which, a traffic volume aggregation unit 301, a parent RU selecting unit 302, and a child RU determination unit 303 are included instead of the connected terminal aggregation unit 122, the parent RU selecting unit 123, and the child RU determination unit 124 included in the connection control device 100 illustrated in FIG. 2.

The traffic volume aggregation unit 301 aggregates the pieces of reception power in each of the terminal devices 30 received from the RUs 20, and estimates a connected terminal to be connected to each of the RUs 20. Specifically, the traffic volume aggregation unit 301 specifies the RU 20 contributing the maximum reception power for each of the terminal devices 30, and estimates that each of the terminal devices 30 is the connected terminal to be connected to the specified RU 20. Then, the traffic volume aggregation unit 301 sums up the traffic volume of each of the RUs 20 associated with the respective connected terminals, and obtains the traffic volume of each of the RUs 20. The traffic volume corresponds to the communication load of the RU 20; therefore, it can be said that the traffic volume aggregation unit 301 aggregates the estimated communication load in each of the RUs 20 in a case where the connected terminals are connected.

Furthermore, in the embodiment, traffic volume information on each of the terminal devices 30 is transmitted from the baseband processing devices 10-1 to 10-M and is received by the communication I/F unit 110 in the connection control device 100. The pieces of traffic volume information are collected by the reception power collecting unit 121 together with the reception power information. The traffic volume information on each of the terminal devices 30 is able to be generated from a result of scheduling performed by the baseband processing devices 10-1 to 10-M. Namely, for example, an amount of data transmitted from the baseband processing devices 10-1 to 10-M to each of the terminal devices 30 within a predetermined time period may be used as a traffic volume, or an amount of the radio resource allocated to each of the terminal devices 30 by the baseband processing devices 10-1 to 10-M within the predetermined time period may be used as a traffic volume.

The parent RU selecting unit 302 selects the parent RU of each of the cells 25-1 to 25-M from the aggregation result obtained by the traffic volume aggregation unit 301 and the location information on each of the RUs 20. Specifically, first, the parent RU selecting unit 302 selects the RU 20 having the maximum traffic volume as a parent RU of a single cell (for example, the cell 25-1). Then, the parent RU selecting unit 302 selects the RU 20 having the maximum distance from the selected parent RU as a parent RU of a subsequent single cell (for example, the cell 25-2). Furthermore, the parent RU selecting unit 302 selects the RU 20 in which the sum of the distances from the selected parent RUs is the maximum as a parent RU of a subsequent single cell (for example, the cell 25-3). In this way, the parent RU selecting unit 302 selects M parent RUs associated with the cells 25-1 to 25-M by selecting the RU 20 having the maximum traffic volume as the first parent RU and subsequently selecting the RU 20 in which the sum of the distances from the selected parent RU is the maximum as the parent RU.

The child RU determination unit 303 calculates an index of the variations in the traffic volume of the cell, and determines the child RU belonging to the same cell as the cell to which each of the M parent RUs belong such that the index is reduced. Specifically, the child RU determination unit 303 selects the cell (for example, the cell 25-Y) having the minimum traffic volume, and specifies an adjacent RU that is adjacent to the RU 20 that has already belonged to the cell 25-Y. Then, the child RU determination unit 303 calculates an index of the variations in the traffic volume of the cell in a case where the adjacent RU is added to the cell 25-Y, and determines the adjacent RU that minimizes this index as the child RU belonging to the cell 25-Y. Furthermore, the "traffic volume of cell" mentioned here is the sum total of the traffic volumes of all of the RUs 20 belonging to the cells. The child RU determination unit 303 determines, regarding the cell in which the traffic volume is the minimum, a single adjacent RU that minimizes the variance index of the traffic volume in the cell as a single child RU, and repeats the determination of the child RU until all of the RUs 20 belong to any of the cells.

Figure 11:
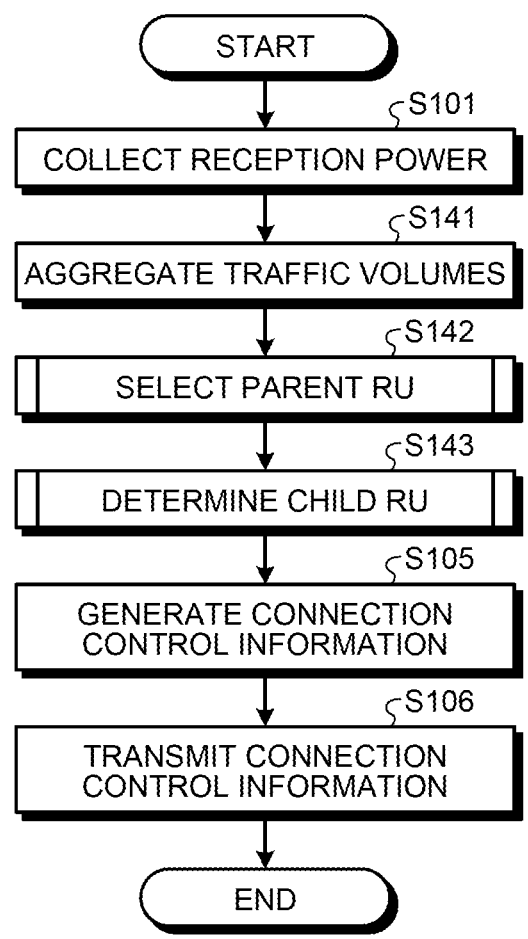
FIG. 11 is a flowchart illustrating a connection control method according to the third embodiment.

In the following, a connection control method used in the connection control device 100 having the configuration described above will be described with reference to the flowchart illustrated in FIG. 11. In FIG. 11, components that are the same as those illustrated in FIG. 3 are assigned the same reference numerals and descriptions thereof in detail will be omitted.

The reception power information reported from each of the terminal devices 30 included in the radio communication system is transmitted from the baseband processing devices 10-1 to 10-M to the connection control device 100, and is then received by the communication I/F unit 110 included in the connection control device 100. Furthermore, after the traffic volume information on each of the terminal devices 30 in accordance with the baseband processing devices 10-1 to 10-M is generated, the traffic volume information is transmitted to the connection control device 100 and received by the communication I/F unit 110 included in the connection control device 100.

Then, the reception power for each of the RUs 20 in the respective terminal devices 30 and the traffic volume of each of the terminal device 30 are collected by the reception power collecting unit 121 (Step S101). The reception power and the traffic volume in each of the terminal devices 30 are used for aggregating the traffic volumes performed by the traffic volume aggregation unit 301. Namely, the RU 20 contributing the maximum reception power is specified for each of the terminal devices 30 by the traffic volume aggregation unit 301, and each of the terminal devices 30 are estimated to be the connected terminals of the specified RU 20. Then, the traffic volume of each of the connected terminals of the RU 20 is added up by the traffic volume aggregation unit 301, and the traffic volume of each of the RUs 20 is collected (Step S141).

If the traffic volume of each of the RUs 20 is collected, the same number of parent RUs as the number of the cells 25-1 to 25-M is selected by the parent RU selecting unit 302 (Step S142). Namely, M parent RUs are selected by the parent RU selecting unit 302 on the basis of the traffic volume of and the location information on each of the RUs 20. The selection of the parent RU is performed by selecting the RU 20 having the maximum traffic volume as a first parent RU, and subsequently, selecting the RU 20 in which the sum of the distances from the selected parent RUs is the maximum as a subsequent parent RU. The parent RU selection process will be described in detail later.

If the M parent RUs are selected, the child RU belonging to the same cell as the cell to which these M parent RUs belong is determined by the child RU determination unit 303 (Step S143). Namely, the variance index of the traffic volume of the cell in a case where the adjacent RU is added to the cell is calculated by the child RU determination unit 303, and the adjacent RU that minimizes the variance index is determined as the child RU. The determination of the child RU is repeated until all of the RUs 20 belong to any of the cells. The child RU determination process will be described in detail later.

All of the RU 20 belong to any of the cells 25-1 to 25-M by the parent RU selection process and the child RU determination process, so that the connection control information that allows the baseband processing devices 10-1 to 10-M to be connected to the RUs 20 that belong to the cells 25-1 to 25-M is generated by the connection control information generating unit 125 (Step S105). The generated connection control information is transmitted from the connection control information transmission unit 140 to the connection switching device 50 (Step S106), and the connection switching device 50 switches the connections between the baseband processing devices 10-1 to 10-M and the RUs 20 in accordance with the connection control information.

In this way, each of the terminal devices 30 is defined as the connected terminals that are to be connected to the RUs 20 each contributing the maximum reception power for the respective connected terminals, the RU 20 that belongs to each of the cells is determined such that the variance index of the traffic volume of the cell is minimized, and the connection relationships between the baseband processing devices 10-1 to 10-M and the RUs 20 associated with the cells are controlled. Consequently, the communication quality of the terminal device 30 is not degraded, the variations in the traffic volume for each cell becomes small, and the processing loads of the baseband processing devices 10-1 to 10-M are averaged. In other words, it is possible to suppress an increase in the processing loads of the baseband processing devices 10-1 to 10-M while preventing degradation of the communication quality in the terminal device 30.

Figure 12:
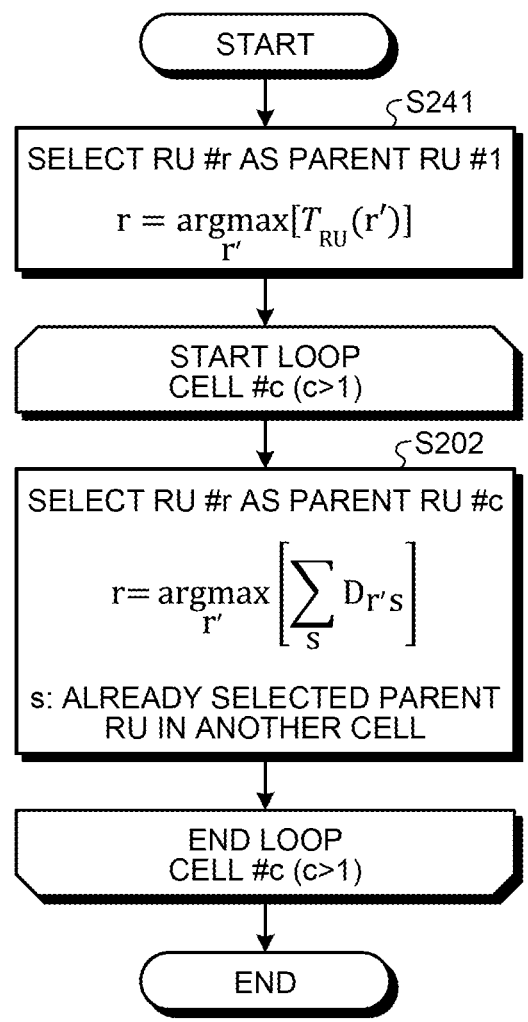
FIG. 12 is a flowchart illustrating a parent RU selection process.

In the following, the parent RU selection process will be specifically described with reference to the flowchart illustrated in FIG. 12. In FIG. 12, components that are the same as those illustrated in FIG. 4 are assigned the same reference numerals and descriptions thereof in detail will be omitted. The following process is performed by the parent RU selecting unit 302.

First, a first parent RU in the cell is selected from the traffic volume of each of the RUs 20. Namely, the RU #r (r denotes the identification information on the RU 20) that satisfies Equation (7) below is selected as the first parent RU #1 (Step S241).

$$r = \underset{r'}{\mathrm{argmax}} [T_{RU}(r')] \tag{7}$$

where, in Equation (7), $T_{RU}(r')$ denotes a traffic volume of the RU #r'. Accordingly, the right side of Equation (7) returns r' indicating that the traffic volume $T_{RU}(r')$ is the maximum. If the RU #r determined by using Equation (7) is selected as the first parent RU #1, the following process is repeated in accordance with the number of cells. Here, because the first parent RU #1 in the cell has been selected, the following process is repeated on the remaining (M−1) cells.

Namely, a process for selecting the RU #r as the parent RU #c of the cell #c is repeated by using Equation (2) above, and the parent RU is selected for each of the M cells 25-1 to 25-M. These parent RUs are disposed at positions at which the sum of the distances is the maximum with each other.

Figure 13:
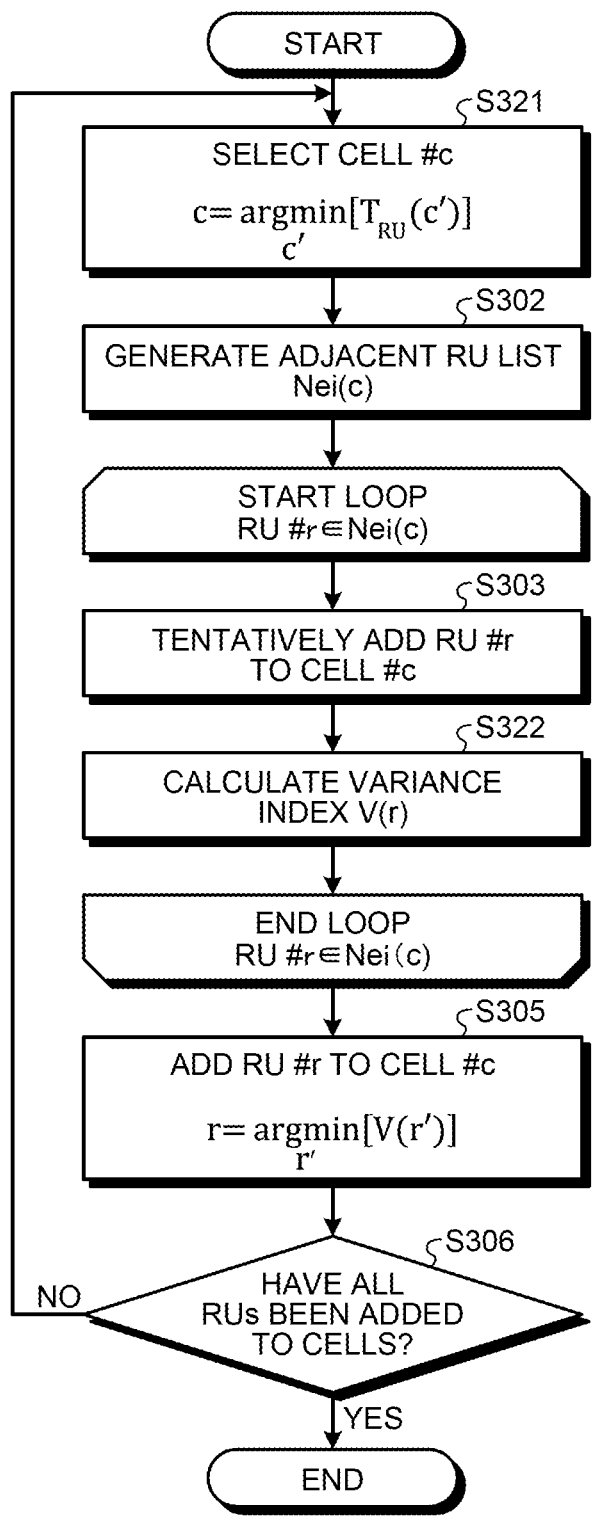
FIG. 13 is a flowchart illustrating a child RU determination process.

In the following, the child RU determination process will be specifically described with reference to the flowchart illustrated in FIG. 13. In FIG. 13, components that are the same as those illustrated in FIG. 5 are assigned the same reference numerals and descriptions thereof in detail will be omitted. The following process is performed by the child RU determination unit 303.

Here, because the parent RUs in respective M cells have already been selected, the cell #c (c denotes the identification information on the cell) is selected from these cells by using Equation (8) below (Step S321).

$$c = \underset{c'}{\operatorname{argmin}} [T_{RU}(c')] \quad (8)$$

where, in Equation (8), $T_{RU}(c')$ denotes a traffic volume of the cell #c'. The traffic volume of the cell #c' indicates the sum total of the traffic volumes of all of the RUs 20 belonging to the cell #c'. The right side of Equation (8) above returns c' indicating that the traffic volume $T_{RU}(c')$ is the minimum. If the cell #c having the minimum traffic volume is selected by using Equation (8), the list Nei(c) of the adjacent RUs in the cell #c is generated (Step S302). Namely, the RU 20 that is adjacent to any of the RUs 20 in the cell #c out of the RUs 20 that do not belong any of the cells is added to the list Nei(c).

If the list Nei(c) of the adjacent RUs in the cell #c is generated, the following process is repeated for each of the adjacent RUs in the cell #c included in the list Nei(c).

Namely, the single adjacent RU #r included in the list Nei(c) is tentatively added to the cell #c (Step S303), the variance index V(r) of the traffic volume of each of the cells in a case where the subject adjacent RU #r is added to the cell #c is calculated by using Equation (9) below (Step S322).

$$V(r) = \frac{1}{N_{cell}} \sum_C T_{RU}(c, r)^2 - \left( \frac{1}{N_{cell}} \sum_C T_{RU}(c, r) \right)^2 \quad (9)$$

where, in Equation (9), $N_{cell}$ denotes the number of cells (here, M), and $T_{RU}(c,r)$ denotes a traffic volume of the cell #c in a case where the adjacent RU #r is added to the cell #c. The variance index V(r) calculated by using Equation (9) corresponds to the index of the variations in the traffic volume of each of the cells in a case where the single adjacent RU #r is added to the cell #c. The traffic volume of the cell corresponds to the index of the processing load of the baseband processing device associated with the subject cell, so that the variance index V(r) functions as the index of the variations in the processing loads of the baseband processing devices 10-1 to 10-M.

In this way, if the variance index V(r) in a case where the adjacent RU #r is added to the cell #c is calculated for each of the adjacent RUs included in the list Nei(c), the adjacent RU #r that satisfies Equation (5) above is added as the child RU in the cell #c (Step S305). Then, it is judged whether all of the RUs 20 are added to any of the cells as the child RUs (Step S306), and, if the RU 20 that does not belong to any of the cells is present (No at Step S306), a process is repeated from the process at Step S321 for selecting the cell #c having the minimum traffic volume.

By performing the child RU determination process described above, all of the RUs 20 belongs to any of the cells and the variations in the traffic volume for each cell is minimized. Namely, the traffic volume of each of the cells is averaged, and the baseband processing devices 10-1 to 10-M with an excessive processing load is not present. In other words, it is possible to suppress an increase in the processing load of the baseband processing devices 10-1 to 10-M.

As described above, according to the embodiment, each of the terminal devices is defined as the connected terminals that are to be connected to the RUs each contributing the maximum reception power for the respective connected terminals, and the RU belonging to each of the cells is determined such that the variations in the traffic volume for each cell is minimized. Consequently, it is possible to suppress an increase in the processing load of the baseband processing device by averaging the traffic volume of the cell associated with each of the plurality of baseband processing device without degrading the communication quality of the terminal device.

Furthermore, each of the embodiments described above may also be appropriately used in combination. Namely, for example, in the third embodiment in which the traffic volume of each of the RUs 20 is used, it may be possible to perform judgement of the adjacent RU by using the interference score according to the second embodiment, select a parent RU, or determine a child RU.

Furthermore, in each of the embodiments described above, it is assumed that the connection control device 100 is configured to be separated from the connection switching device 50; however, the connection control device 100 and the connection switching device 50 may be integrated into a single device.

According to an aspect of an embodiment of the connection control device, the communication system, and the connection control method disclosed in the present application, an advantage is provided in that it is possible to suppress an increase in a processing load while preventing degradation of communication quality.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A connection control device comprising:
   a memory; and
   processor circuitry coupled to the memory, and configured to execute a process including:
      acquiring information on reception power in a plurality of terminal devices received from each of a plurality of radio units;
      aggregating an estimated communication load in each of the radio units by using the information on the reception power;
      determining a radio unit that belongs to each of a plurality of cells on a basis of an index indicating variance in a processing load for each cell associated with the estimated communication load in each of the radio units in the respective cells; and
      generating connection control information that allows a baseband processing device that manages a cell to be connected to the radio unit that belongs to the cell,
   wherein
      the determining includes
         selecting a parent radio unit belonging to each of the cells on a basis of positional relationships between the radio units, and
         determining a child radio unit by determining, on a basis of the index indicating the variance in the processing load for each cell to which the parent radio unit belongs, whether an adjacent radio unit that is adjacent to the cell to which the parent radio unit belongs is allowed to be the child radio unit that belongs to the same cell as the cell to which the parent radio unit belongs.

2. The connection control device according to claim 1, wherein the aggregating includes aggregating the number of connected terminals to be connected to each of the radio units in a case where each of the terminal devices serves as a connected terminal that performs radio communication with a radio unit contributing the maximum reception power.

3. The connection control device according to claim 1, wherein the aggregating includes aggregating a traffic volume of connected terminals to be connected to each of the radio units in a case where each of the terminal devices serves as a connected terminal that performs radio communication with a radio unit contributing the maximum reception power.

4. The connection control device according to claim 1, wherein the selecting includes selecting a first radio unit to which a maximum estimated communication load is applied as a parent radio unit that belongs to a first cell, and selecting a second radio unit in which a sum of distances between the second radio unit and each of the selected parent radio units is the maximum as a parent radio unit that belongs to another cell.

5. The connection control device according to claim 1, wherein the determining the child radio unit includes adding the adjacent radio unit as the child radio unit belonging to the cell such that the index indicating the variance in the processing load for each cell is minimized.

6. The connection control device according to claim 1, wherein the process further includes calculating an interference score indicating a magnitude of interference between a pair of the radio units by using the information on the reception power, and
the selecting includes selecting the parent radio unit on a basis of the positional relationships between the radio units in accordance with the interference score.

7. The connection control device according to claim 1, wherein the process further includes calculating an interference score indicating a magnitude of interference between a pair of the radio units by using the information on the reception power, and
the determining the child radio unit includes determining whether the adjacent radio unit specified by using the interference score is allowed to be the child radio unit.

8. A communication system comprising a plurality of radio units that perform radio communication with a plurality of terminal devices, a plurality of baseband processing devices that are connected to the radio units, and a connection control device that controls a connection between the radio units and the baseband processing devices, wherein the connection control device includes
a memory, and
processor circuitry coupled to the memory, and configured to execute a process including:
acquiring information on reception power in the terminal devices received from each of the radio units;
aggregating an estimated communication load in each of the radio units by using the information on the reception power;
determining a radio unit that belongs to each of a plurality of cells on a basis of an index indicating variance in processing load for each cell associated with the estimated communication load in each of the radio units in the respective cells; and
generating connection control information that allows a baseband processing device that manages a cell to be connected to the radio unit that belongs to the cell, wherein
the determining includes
selecting a parent radio unit belonging to each of the cells on a basis of positional relationships between the radio units, and
determining a child radio unit by determining, on a basis of the index indicating the variance in the processing load for each cell to which the parent radio unit belongs, whether an adjacent radio unit that is adjacent to the cell to which the parent radio unit belongs is allowed to be the child radio unit that belongs to the same cell as the cell to which the parent radio unit belongs.

9. A connection control method comprising:
acquiring information on reception power in a plurality of terminal devices received from each of a plurality of radio units;
aggregating, by processor circuitry, an estimated communication load in each of the radio units by using the information on the reception power;
determining, by the processor circuitry, a radio unit that belongs to each of a plurality of cells on a basis of an index indicating variance in processing load for each cell associated with the estimated communication load in each of the radio units in the respective cells; and
generating, by the processor circuitry, connection control information that allows a baseband processing device that manages a cell to be connected to the radio unit that belongs to the cell, wherein
the determining includes
selecting a parent radio unit belonging to each of the cells on a basis of positional relationships between the radio units, and
determining a child radio unit by determining, on a basis of the index indicating the variance in the processing load for each cell to which the parent radio unit belongs, whether an adjacent radio unit that is adjacent to the cell to which the parent radio unit belongs is allowed to be the child radio unit that belongs to the same cell as the cell to which the parent radio unit belongs.

\* \* \* \* \*